United States Patent [19]
Ferguson

[11] Patent Number: 5,603,967
[45] Date of Patent: Feb. 18, 1997

[54] MOLDING APPARATUS WITH SHUTTLE AND LOCK MECHANISMS

[75] Inventor: Jerry W. Ferguson, Pink Hill, N.C.

[73] Assignee: White Consolidated Industries, Inc., Cleveland, Ohio

[21] Appl. No.: 374,181

[22] Filed: Jan. 18, 1995

[51] Int. Cl.$^6$ .................................................. B29C 45/66
[52] U.S. Cl. .......................... 425/556; 264/334; 425/575; 425/595
[58] Field of Search .................................... 425/574, 575, 425/595, 556; 264/334

[56] References Cited

U.S. PATENT DOCUMENTS

| | | |
|---|---|---|
| 3,262,158 | 7/1966 | Von Reimer et al. . |
| 3,327,353 | 6/1967 | Eggenberger . |
| 4,005,964 | 2/1977 | Bishop . |
| 4,273,524 | 6/1981 | Smith . |
| 4,432,720 | 2/1984 | Wiatt et al. . |
| 4,579,519 | 4/1986 | Mäser et al. . |
| 4,588,364 | 5/1986 | Schad . |
| 4,594,067 | 6/1986 | Langos . |
| 4,608,005 | 8/1986 | Hayashi et al. . |
| 4,611,981 | 9/1986 | English . |
| 4,626,190 | 12/1986 | Hellmer . |
| 4,698,012 | 10/1987 | Shelby et al. . |
| 4,768,946 | 9/1988 | Maruyama et al. . |
| 4,810,181 | 3/1989 | Ozawa . |
| 4,861,258 | 8/1989 | Margiaria et al. ...................... 425/575 |
| 4,959,191 | 9/1990 | Yoshioka et al. . |
| 5,044,927 | 9/1991 | DiSimone et al. . |
| 5,055,250 | 10/1991 | Schad et al. ............................ 425/595 |
| 5,306,325 | 4/1994 | Smith et al. . |

Primary Examiner—Tim Heitbrink
Attorney, Agent, or Firm—Pearne, Gordon, McCoy & Granger

[57] ABSTRACT

Plastic parts are molded in an apparatus having two molds mounted on a reciprocating shuttle bed. While one mold is filled with resin at a filling position, the other mold is at an unloading position where a part cools and is extracted. The bed is then shuttled so that the other mold is at the filling position and the one mold is at a second unloading position. The molds have separable mold halves closed by a suitable driver. A toggle mechanism engages latches on the mold halves to lock the mold closed. The toggle is a pair of pivoting leaves on a transversely movable post. The edges of the leaves separate and engages stops on the latches. An extrusion head advances to the mold for filling and is withdrawn for shuttling. A part extractor is movable between the unloading positions and places the parts in a bin.

10 Claims, 5 Drawing Sheets ced by the mold closing 30 at the first unloading position.

MOLDING APPARATUS WITH SHUTTLE AND LOCK MECHANISMS

BACKGROUND OF THE INVENTION

1. Field of the Invention

This invention relates generally to the field of plastic molding and specifically to shuttle and lock features of a molding apparatus.

2. Description of the Related Art

Plastic parts are commonly molded in an apparatus having a pair of separable mold halves. Generally, one mold half is stationary and the other is movable. The mold halves are closed and molten resin is injected into a cavity defined by the mold. In some cases, a gas is blown into the mold to create a hollow body of the resin. After cooling, the mold halves are separated and the molded part is removed. The operation is then repeated for subsequent parts.

To increase the rate at which parts can be molded, U.S. Pat. No. 4,810,181 to Ozawa, incorporated herein by reference, shows a molding apparatus that alternately shuttles two molds from an injection/unloading station to respective cooling stations. Still, it would be desirable to have a mold shuttling apparatus that allows one mold to cool and be unloaded while the other is filled and blown.

During molding, it is necessary to provide a locking force to maintain the molds in the closed position to withstand the heat and pressure of the molding and blowing. Such a locking force can be provided as a part of the mold closing mechanism, that is, the mold closing mechanism can provide enough force to maintain the mold in the closed position. Alternatively, a separate locking mechanism can be provided to lock the mold in the closed position after it has been closed by a closing mechanism. Examples of different closing and/or locking mechanisms are shown in U.S. Pat. Nos. 3,262,158; 3,327,353; 4,005,964; 4,273,524; 4,432,720; 4,579,519; 4,588,364; 4,594,067; 4,608,005; 4,611,981; 4,626,190; 4,698,012; 4,768,946; 4,810,181; 4,959,191; 5,044,927; and 5,306,325, all incorporated herein by reference. It would be desirable to provide an improved separate locking mechanism that positively secures the molds in the closed position with a minimum input of force.

SUMMARY OF THE INVENTION

The present invention provides a molding apparatus having separable mold sections and means to close the mold sections. A first latch disposed on one of the mold sections defines a first stop. A second latch disposed on another of the mold sections definines a second stop opposed to the first stop. A movable toggle is adapted to engage the latch stops so as to resist separation of the mold sections.

The toggle includes a pair of leaves mounted for relative pivoting movement on an axis. A driver is adapted to move the leaves transversely relative to the axis. The leaves define edges separable by pivoting movement of the leaves and adapted to engage respective latch stops. The latches overlap, the latch stops are located on opposite sides of the axis, and the latch stops face generally toward the axis. The leaves are biased toward a relative angular orientation and transverse movement of the leaves causes the leaf edges to spread as the leaves engage the latch to urge the leaf edges toward the respective latch stops. Each latch comprises a rigid bar extending from the corresponding mold section toward the other mold section. Each latch includes a notch defining the corresponding latch stop.

In a preferred embodiment of the invention, the molding apparatus includes a movable bed. The two molds are mounted for movement with the bed. An extrusion head is located adjacent the bed. The bed provides movement of one of said molds between a filling position adjacent the extrusion head and a first unloading position. The bed also provides movement of said other mold between a second unloading position and the filling position. A part extractor located adjacent the bed is adapted to remove a part from the mold in the corresponding unloading position of the mold.

The molds are mounted on the bed for simultaneous movement. The molds are mounted so as to be stationary relative to each other along an axis of movement. The molds are mounted on the bed for reciprocating movement with the bed. The molds comprise separable mold sections adapted to open and close. Latches disposed on the molds are adapted to lock the mold sections in a closed position. The part extractor includes an arm movable between the unloading positions and adapted to remove the part from the corresponding mold. The extrusion head is retractable from the mold at the filling position to permit movement of the molds.

The invention also provides a method of molding. Steps include closing a first mold; filling the first mold with a plastic resin at a filling position to form a first molded part; moving the first mold to a first unloading position and moving a second mold to the filling position; closing the second mold; filling the second mold with a plastic resin at the filling position to form a second molded part; opening the first mold; and removing the first part from the first mold at the first unloading position.

Additional steps include allowing the first part to cool in the first mold before opening the first mold; moving the second mold to a second unloading position and moving the first mold to the filling position; opening the second mold; removing the second part from the second mold at the second unloading position; and allowing the second part to cool in the second mold before opening the second mold. Further steps include advancing an extrusion head for injecting the resin to the first mold before filling the first mold, and withdrawing the extrusion head from the first mold after filling the first mold; locking the corresponding mold after closing the mold, and unlocking the mold before opening the mold; and blowing a gas into the corresponding mold after filling the mold.

The steps of moving the molds comprise reciprocating movement. The molds are stationary relative to each other along an axis of movement, and the step of moving the molds comprises moving both molds simultaneously.

DESCRIPTION OF THE PREFERRED EMBODIMENTS

Figure 1:
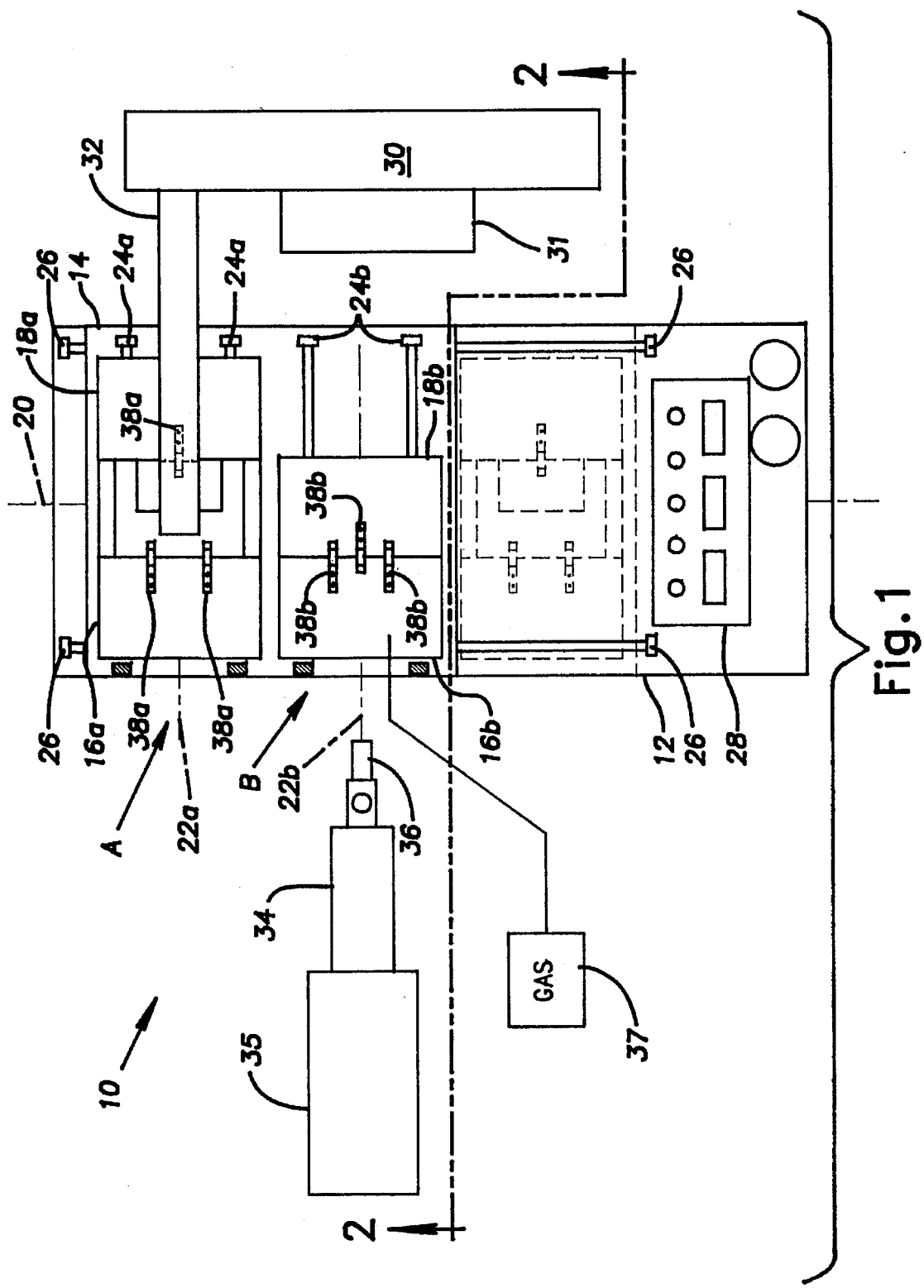
FIG. 1 shows a schematic top view of a molding apparatus according to the invention with an upper part of the apparatus removed for clarity.

Referring to FIG. 1, a molding apparatus 10 includes a frame 12 supporting a movable bed 14. A pair of molds A and B are mounted on the bed. In the following description, numbers are used to refer to components generally and numbers with lower case letters identify the same components as related to the corresponding mold designated A or B. Each mold comprises a first mold section, such as a stationary mold half 16a, 16b, and a second mold section, such as a movable mold half 18a, 18b, mounted on the bed 14. The mold halves 16, 18 define a cavity therein adapted to form a charge of resin to a desired shape. In the embodiment shown, the molds A, B are configured generally for the purpose of molding dishwasher tubs. The bed 14 is transversely movable on a bed axis 20 and each movable mold half is transversely movable on a mold axis 22a, 22b. The molds A, B are mounted on the bed 14 such that the molds A, B are stationary relative to each other along the bed axis 20. Each movable mold half 18a, 18b is provided with a suitable closing mechanism 24a, 24b, such as hydraulically operated pistons or screw drives, for moving the mold halves 18a, 18b on their respective axes 22a, 22b. The bed 14 is provided with a suitable shuttling device 26, such as opposed hydraulically operated pistons or screw drives, for moving the bed 14 on its axis 20. The closing mechanisms 24 and shuttling device 26 can be operated by any suitable source of power, such as d.c. motors or a hydraulic system. The bed 14 is adapted to shuttle the molds A, B between a filling position and respective unloading positions, as discussed in more detail below. Briefly, in FIG. 1, the first mold A is shown in its unloading position, and the second mold B is shown in the filling position. The phantom outline shows the second mold B in its unloading position. A control panel 28 for controlling operation of the apparatus 10 is provided on the frame 12.

Figure 2:
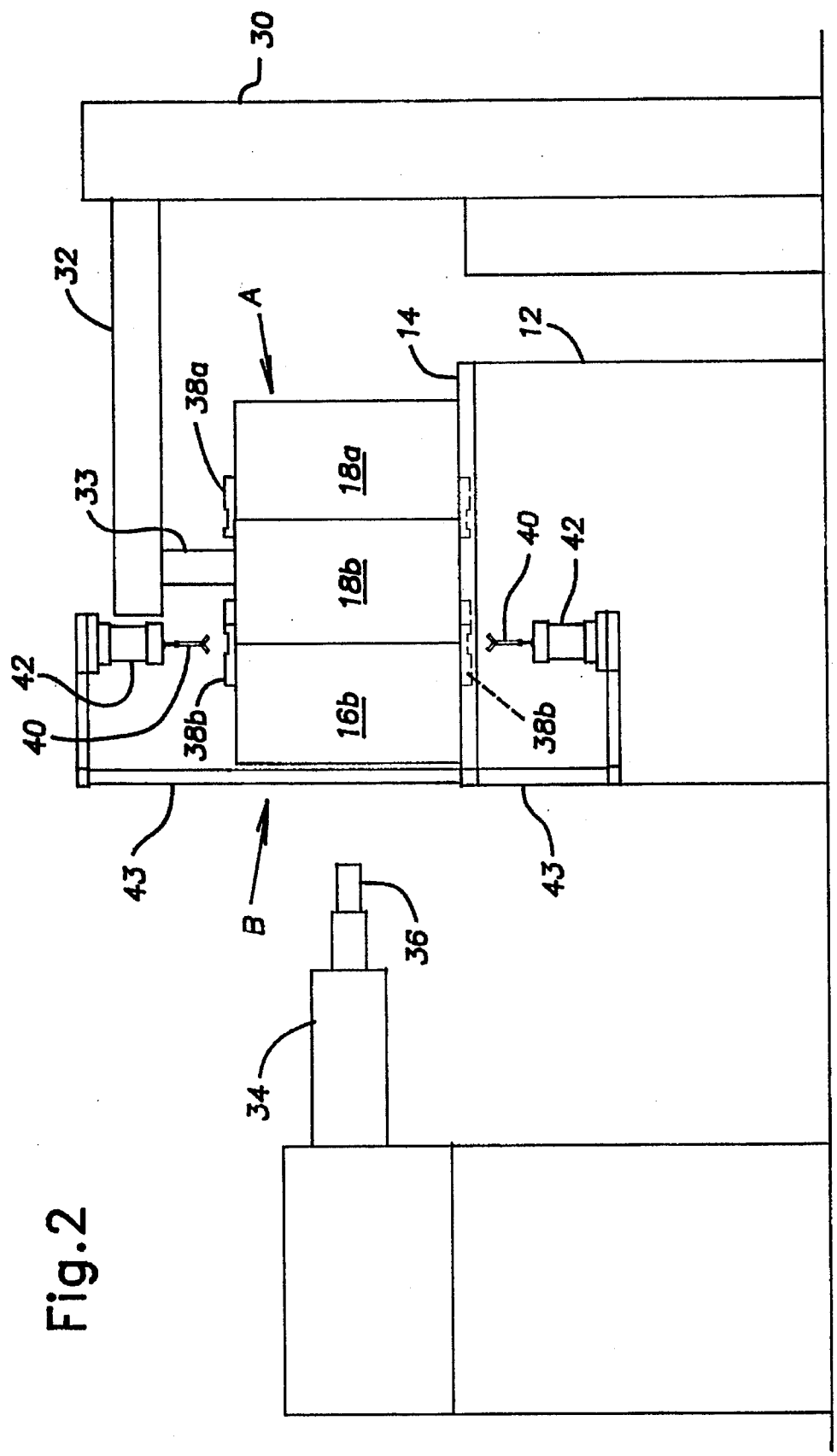
FIG. 2 shows a schematic side elevational view of the molding apparatus taken from line 2—2 of FIG. 1.

A part extractor 30 having an unloading bin 31 is located adjacent the frame 12 and has an unloading arm 32 extending over the first mold A in its unloading position. The unloading arm 32 is transversely movable to permit positioning over the unloading position of the second mold B as well. Alternatively, a second unloading arm can be provided over the second unloading position. As shown in FIG. 2, the unloading arm 32 is provided with a grasping device 33 adapted to reach into the open mold A at the unloading position and grasp a molded part.

An extrusion pump 34 is provided adjacent the frame 12 and opposite the part extractor 30. The pump is operated by an electric motor 35 for example. The pump 34 has an extrusion head 36 adapted to inject plastic resin into one of the molds A, B in the filling position. A gas injector 37 is provided to inject gas at appropriate locations inside the mold A, B.

Referring to FIGS. 1 and 2, each of the molds A, B is provided with a set of mold latches 38a, 38b on the top and bottom of each mold half 16, 18. Referring to FIG. 2, a toggle assembly 40, including a toggle joint powered by a driver, such as a hydraulic cylinder 42, is associated with the top and bottom of each mold A, B. Each cylinder 42 is mounted on a support arm 43 extending from the bed 14 for transverse movement therewith.

Figure 3:
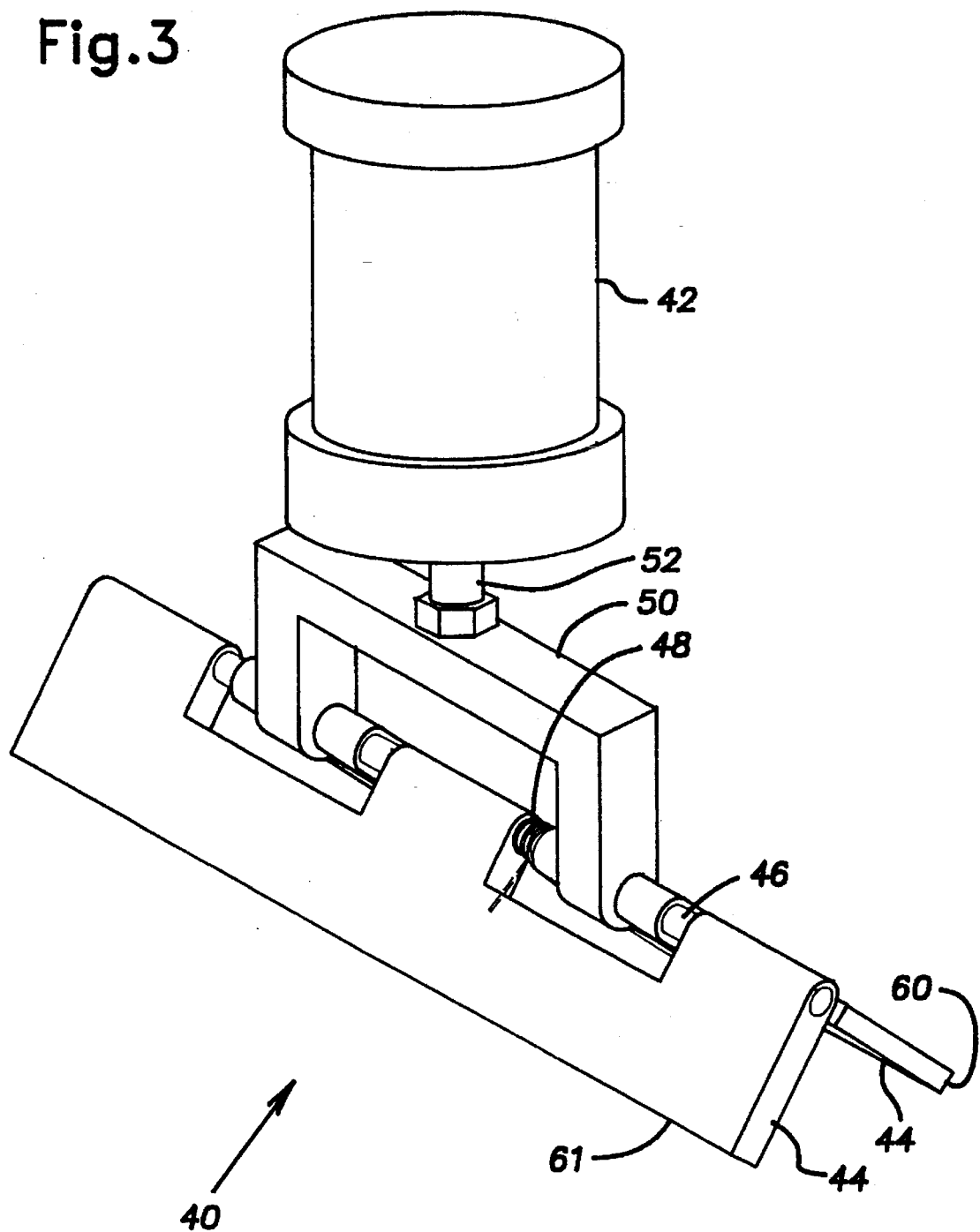
FIG. 3 shows an isometric detail view of a locking apparatus according to the invention.

Referring to FIG. 3, the toggle assembly 40 includes a pair of leaves 44 having a generally rectangular cross section pivotably mounted on a post 46 to form the toggle joint. The leaves 44 and post 46 are made of a strong, rigid material adapted to withstand a high compressive force without yielding substantially. The leaves 44 are pivotable between a relative orientation of about a right angle (shown in FIG. 3 in a disengaged position) and a coplanar orientation (shown in FIG. 4 in an engaged position). Preferably, the leaves are biased toward the right angular orientation by a torsional spring 48, gravity, or other suitable means. The post 46 is operatively connected to the hydraulic cylinder by a base 50 mounted on a piston 52 of the cylinder adapted to provide transverse movement of the post 46.

Figure 4:
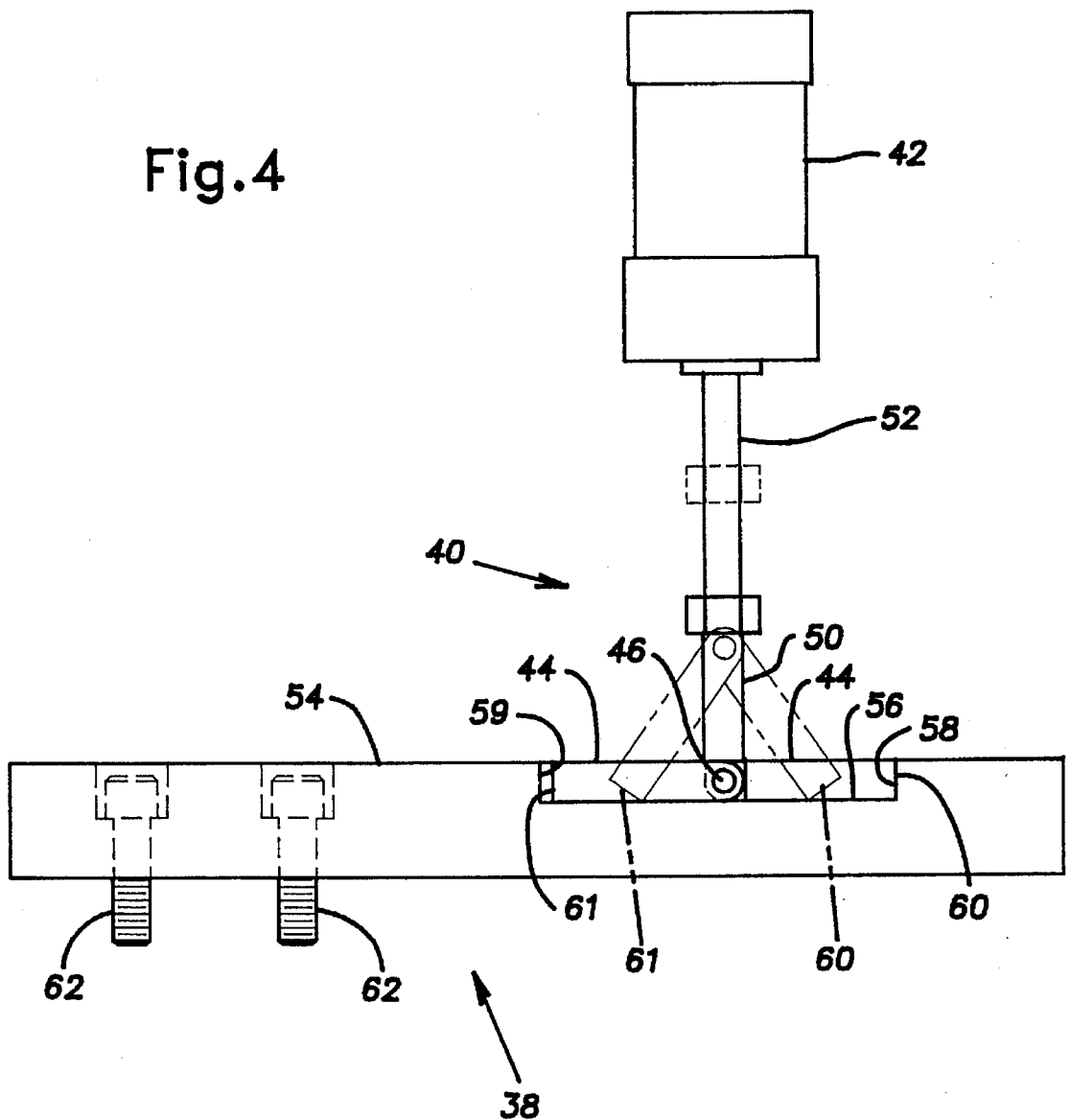
FIG. 4 shows a side elevational view of the locking apparatus.

Referring to FIG. 4, the mold latch 38 is a strong, rigid bar 54 having a generally rectangular notch 56. The toggle 40 is adapted to seat in notch 56. The notch 56 conforms to the leaves 44 in the engaged position and defines a stop 58 adapted to mate with an edge 60 or 61 of one of the leaves 44. The notch can also define a wall 59 opposite the stop 58.

During transverse movement of the toggle 40, the leaves 44 engage and slide along the notch, thereby spreading the edges 60 of the leaves 44, as shown in phantom. The toggle 40 seats in the notch with the leaves 44 in a coplanar orientation. One of the leaf edges 60 engages the stop 58. The other leaf edge 61 should be spaced slightly from the wall 59. As discussed below, at least a second latch is provided in an orientation opposite of the latch shown in FIG. 4. The latches overlap and the stop of the second latch is opposed to the stop 58 of the first latch. That is, both stops 58 face generally toward the axis of the post 46. The edge 61 of the other leaf 44 engages the stop of the second latch.

Referring to FIGS. 1, 2, and 4, two mold latches 38 are mounted, for example with screws 62, on both the top and bottom of each stationary mold half 16 and one mold latch 38 is mounted on both the top and bottom of the movable mold half 18. The latches 38 are aligned so that when the mold halves 16, 18 are closed, the toggle 40 fits firmly in the notches 56 of all three of the corresponding latches 38. In the engaged position, the edge 61 of one leaf 44 engages the stop 58 of one latch 38 and the edge 60 of the other leaf 44 engages the stops 58 of the other two latches 38, thereby providing a locking force holding the mold halves 16, 18 in the closed position. As the toggle 40 is moved into the engaged position, the leaves 44 spread to the coplanar orientation to provide the locking force. Opening of the mold halves 16, 18 is resisted by the compressive strength of the leaves 44 and post 46. Moving the toggle 40 from the disengaged to the engaged position requires a modest transverse force compared to the high locking force required. As is apparent from FIG. 2, the leaves 44 in the toggles 40 above the molds A, B tend to fall by gravity into the right angular orientation when lifted by the cylinder 42. However, the leaves 44 in the toggles 40 below the molds A, B require the spring 48 bias to achieve the right angular orientation when lowered by the cylinder 42.

Figure 5A:
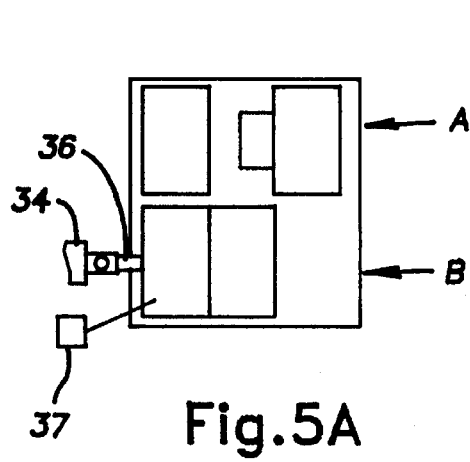
FIGS. 5A through 5E show a schematic top view of a molding operation according to the invention.
Figure 5D:
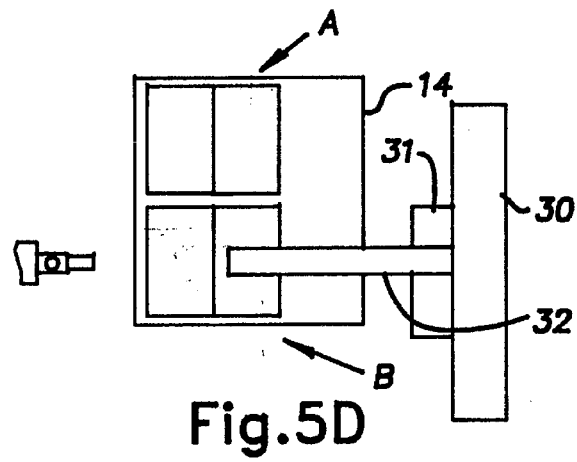
Figure 5B:
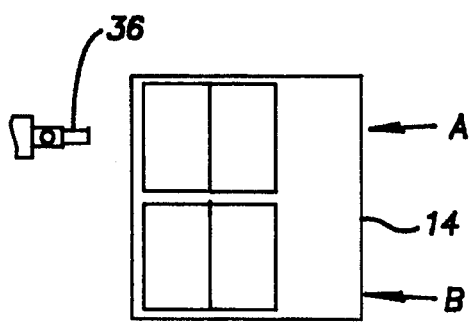
Figure 5E:
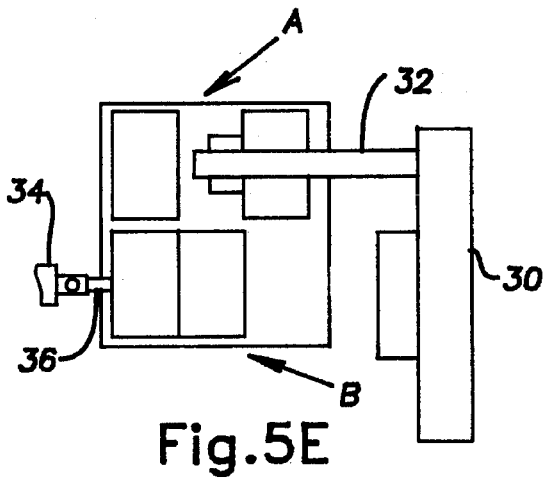
Figure 5C:
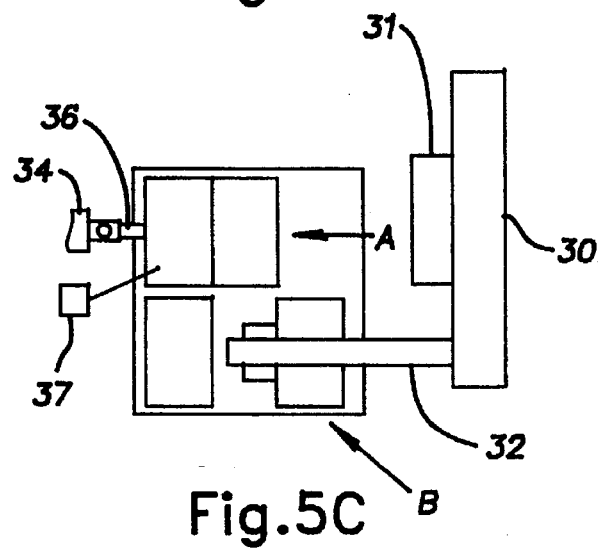

Referring to FIGS. 5A through 5E, showing operation of the molding apparatus 10, it is assumed that a molding cycle is in progress and a molded part has been removed from mold A. As shown in FIG. 5A, mold A is in the unloading position and mold B is in the filling position. Mold B is closed and, by operation of the toggles 40 and latches 38, locked. The extrusion head 36 is advanced into place at the mold B and the pump 34 is activated to fill the mold with a selected amount of resin. If desired, a gas charge, such as nitrogen, is injected into mold B at selected locations. Referring to FIG. 5B, the extrusion head 36 is withdrawn from mold B. To begin a new molding cycle for mold A, the bed 14 is shuttled to its alternate position. Mold A is now closed and located in the filling position. Mold B is located in its unloading position, but remains closed and locked for cooling. Referring to FIG. 5C, mold A is locked, then filled by the extrusion pump 34 and injected with a gas charge. After a suitable amount of cooling time, mold B is opened and the arm 32 of the part extractor 30 is moved over mold B and removes the molded part. Referring to FIG. 5D, The part extractor 30 places the part in the unloading bin 31. The extrusion head 36 is withdrawn and the bed 14 is shuttled again to begin a new molding cycle for mold B. Mold B is now closed and located in the filling position. Mold A is located in its unloading position, but remains closed and locked for cooling. Referring to FIG. 5E, mold B is locked, then filled with the extrusion pump 34 and injected with a gas charge. After a suitable amount of cooling time, mold A is opened and the arm 32 of the part extractor 32 is moved over mold A and removes the molded part. The part is then placed in the unloading bin 31. Thus, the molds A, B are moved simultaneously in a reciprocating manner from the filling position to the respective unloading positions. Operation continues with alternate filling, cooling, and unloading of molds A and B.

The present disclosure describes several embodiments of the invention, however, the invention is not limited to these embodiments. Other variations are contemplated to be within the spirit and scope of the invention and appended claims.

What is claimed is:

1. A molding apparatus, comprising a movable bed, two molds mounted for movement with the bed, an extrusion head located adjacent the bed, said bed being adapted for providing movement of one of said molds between a filling position adjacent the extrusion head and a first unloading position, said bed also being adapted for providing movement of said other mold between a second unloading position and the filling position, a part extractor located adjacent the bed and adapted to remove a part from the mold in the corresponding unloading position of the mold, wherein the molds comprise separable mold sections adapted to open and close at a parting line, latches disposed on each of the mold sections and adapted to lock the mold sections of one of said molds in a closed position when in said filling position, a movable toggle adapted to engage the latches, thereby locking said mold sections, wherein the toggle comprises a pair of leaves mounted for relative pivoting on an axis, edges of said leaves being adapted to engage the latches of said one of said molds.

2. An apparatus according to claim 1, further comprising a driver adapted to move the leaves transversely relative to the axis.

3. An apparatus according to claim 1, wherein the edges are separable by pivoting movement of the leaves.

4. An apparatus according to claim 3, wherein the latches overlap each other in the closed position when viewed along the parting line, said latches defining latch stops located on opposite sides of the axis and engaged by the edges of the leaves, and the latch stops facing generally toward the axis.

5. An apparatus according to claim 3, wherein the leaves are biased toward a relative angular orientation and transverse movement of the leaves causes the leaf edges to spread as the leaves engage the latch to urge the leaf edges toward respective latch stops defined by edges of the latches.

6. An apparatus according to claim 1, wherein each latch comprises a rigid bar extending from the corresponding mold section toward the other mold section.

7. An apparatus according to claim 6, wherein each latch includes a notch defining a corresponding latch stop.

8. A molding apparatus, comprising:

a movable bed;

two molds mounted for movement with the bed, the molds comprising separable mold sections adapted to open and close;

an extrusion head located adjacent the bed;

said bed being adapted for providing movement of one of said molds between a filling position adjacent the extrusion head and a first unloading position, said bed also being adapted for providing movement of said other mold between a second unloading position and the filling position;

a latch disposed on each of the mold sections and adapted to lock the mold sections of one of said molds in a closed position when in said filling position;

a movable toggle adapted to engage the latches, thereby locking the mold sections, wherein the toggle comprises a pair of leaves mounted for relative pivoting movement on an axis, edges of said leaves being adapted to engage the latches of one of said molds; and a part extractor located adjacent the bed and adapted to remove a part from the respective mold in each of the corresponding unloading positions of the respective molds.

9. A molding apparatus according to claim 8, wherein the part extractor includes an arm movable between the unloading positions and adapted to remove the part from the corresponding mold.

10. A molding apparatus according to claim 8, wherein the extrusion head is retractable from the mold at the filling position to permit movement of the molds.

* * * * *